United States Patent [19]
Urffer et al.

[11] Patent Number: 5,631,084
[45] Date of Patent: May 20, 1997

[54] THERMALLY-INSULATING COMPONENTS MADE OF THERMALLY-STABILIZED REFRACTORY CERAMIC FIBERS

[75] Inventors: Daniel Urffer, Morieres-les-Avignon; Joseph Recasens, Sorgues, both of France

[73] Assignee: Societe Europeenne des Produits Refractaires, Courbevoie, France

[21] Appl. No.: 360,631

[22] Filed: Dec. 21, 1994

[30] Foreign Application Priority Data

Dec. 28, 1993 [FR] France .................. 93 15754

[51] Int. Cl.$^6$ .................................................. B32B 9/00
[52] U.S. Cl. ........................ 428/384; 428/359; 428/364; 501/38
[58] Field of Search ................... 501/38; 428/359, 428/364, 384

[56] References Cited

U.S. PATENT DOCUMENTS

| | | |
|---|---|---|
| 2,873,197 | 2/1959 | McMullen . |
| 4,238,257 | 12/1980 | Remi et al. . |
| 4,440,099 | 4/1984 | Brachet et al. . |
| 4,558,015 | 12/1985 | Ekdahl et al. . |
| 4,607,697 | 8/1986 | Urffer ........................ 166/280 |
| 4,910,174 | 3/1990 | Bert et al. ..................... 501/105 |
| 5,137,848 | 8/1992 | Barker et al. ................... 501/18 |

FOREIGN PATENT DOCUMENTS

| | | |
|---|---|---|
| 0390223 | 10/1990 | European Pat. Off. . |
| 0450323 | 10/1991 | European Pat. Off. . |
| 2403317 | 4/1979 | France . |
| 2507594 | 12/1982 | France . |
| 2664586 | 1/1992 | France . |

*Primary Examiner*—Helen Lee
*Attorney, Agent, or Firm*—Watson Cole Stevens, Davis, P.L.L.C.

[57] ABSTRACT

The invention relates to a refractory thermally-insulating component consisting essentially of refractory ceramic fibers which are mechanically combined with one another, the composition of which comprises at least 97.5% by weight of alumina, silica and zirconia in total, wherein:

a) no organic or inorganic binder binds the fibers to one another;

b) the fibers have the following chemical composition, as % by weight:
   $Al_2O_3$: 33–45%
   $SiO_2$: 41–53%
   $ZrO_2$: 5.5–17%
   MgO: 0.02–2% other oxides:<0.50% with $Fe_2O_3+TiO_2 \leq 0.20\%$ and $Na_2O+CaO+K_2O \leq 0.30\%$;

c) the said fibers homogeneously have, throughout the entire body of the component, a degree of crystallinity of not less than 30% and not more than 64%, the crystals present being essentially formed of mullite crystals and of quadratic zirconia; and d) the said component has a linear shrinkage of no more than 3% after being held for 24 hours at 1450° C.

5 Claims, 1 Drawing Sheet

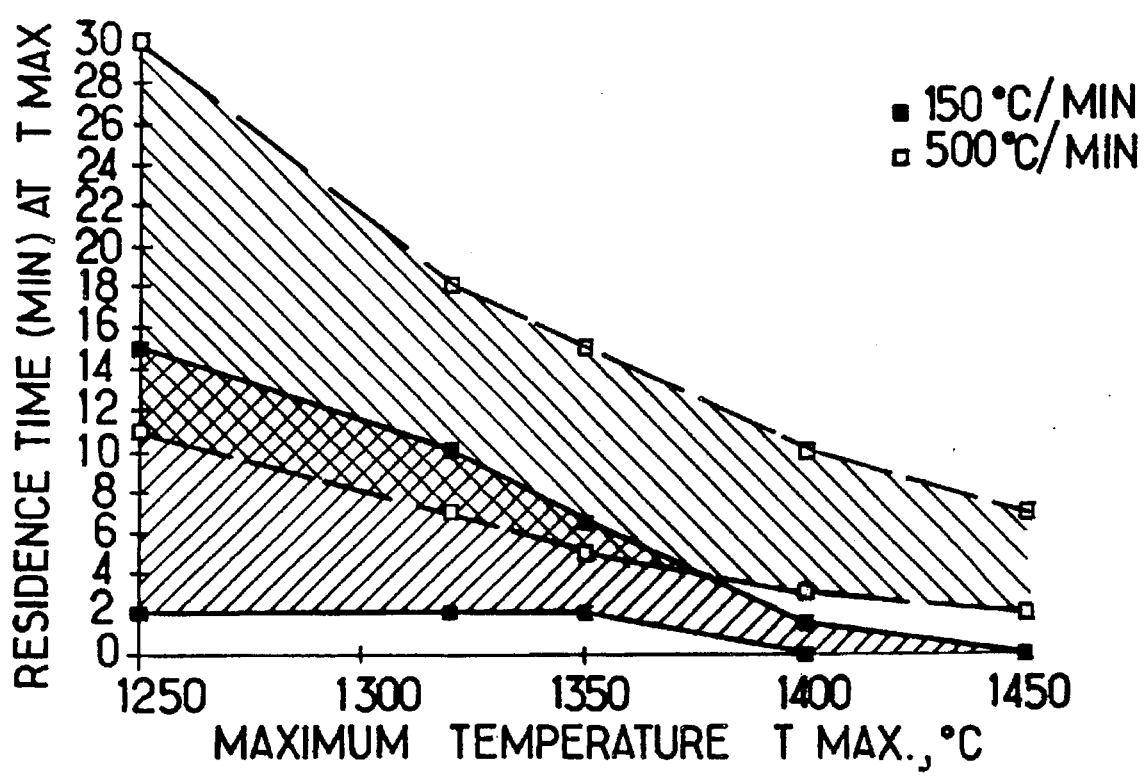

THERMALLY-INSULATING COMPONENTS MADE OF THERMALLY-STABILIZED REFRACTORY CERAMIC FIBERS

The invention relates to thermally-insulating components made of thermally-stabilized refractory ceramic fibers.

BACKGROUND OF THE INVENTION

Use is made for insulating industrial furnaces, as soon as the continuous operating temperature approaches or exceeds 1300° C., of modular components made of refractory ceramic fibers of the "module" type, such as those described in French Patent No. 2,403,317 or its American equivalent U.S. Pat. No. 4,238,257, or of the "block" type, such as described in French Patent No. 2,507,594 or its American equivalent No. 4,440,099.

Modules, also sometimes known as slabs, are components with a generally square shape and with a thickness of between 25 and 100 mm formed by a plurality of strips held assembled side by side, without compression, each strip consisting of entangled refractory fibers, most of which are perpendicular to the two main faces of the slab. Installation is carried out by adhesion using a cement to the existing linings consisting of bricks or concrete or of a first layer of fiber-based blocks.

Blocks, of parallelepipedal shape, have thicknesses from 100 to 300 mm and are also formed of strips of refractory fibers juxtaposed and precompressed in a casing formed from a plastic film or net. They additionally contain a system, generally metallic, of support for ensuring cohesion of the strips and of attachment to enable them to be quickly put into place.

Among the refractory ceramic fibers used for manufacturing such modules and blocks are AZS fibers, that is to say fibers whose composition mainly consists of alumina, zirconia and silica and which are obtained by melting a mixture of the oxides constituting the refractory composition and dispersion of the molten material as fibers, either by blowing or using one or a number of rotors, as is well known to those skilled in the art. FR-A-1,152,574 and its equivalent U.S. Pat. No. 2,873,197 describe such fibers consisting, by weight, of 40–60% $SiO_2$, 20–45% $Al_2O_3$ and 3.5–20% $ZrO_2$.

It should be noted that the fibrous masses formed from mixtures of molten oxides generally comprise pseudospherical particles known as "shots" in an amount which can reach 35 to 55% of the total weight. In what follows, however, "fibers" will denote a mass consisting of fibers with a diameter of between 0.5 and 10 μm (on average 1.5 to 3 μm) and of shots, defined by a length/diameter ratio of less than 5. The level of shots is measured according to the NF.40455 test, which makes it possible to estimate the proportion of shots with a size greater than or equal to 40 μm.

However, despite a chemical composition suitable for high temperatures, that is to say an intrinsic refractoriness which is amply sufficient since melting only takes place from 1650° C., it is well known that, in practice, the limit for continuous industrial use of such products based on AZS fibers is of the order of 1330° C.

This is due to transformations which take place at the level of the fibers themselves by a change in their crystallographic composition related to a devitrification phenomenon (transition from the starting amorphous vitreous state to a partially crystalline state at approximately 1000° C. for the AZS fibers) promoted by the alkaline impurities and by the presence of calcium, iron and titanium oxides. This devitrification leads to a significant contraction in size of the individual fibers. The crystallization leads to embrittlement of the fibers which become more rigid and brittle, all the more so as the crystals formed become bigger. The AZS fibers are also subject to sticking at the points of contact between the fibers due to the softening—during the devitrification process—of the residual vitreous phase.

Moreover, a problem specific to modular and block components made of fibers, especially AZS fibers, is that the transformations do not take place throughout the entire volume of the product but progressively, to a certain depth, from the face exposed directly to the heat flow (often known as the hot face by experts), which gradually makes the structure of the whole body heterogeneous.

These phenomena lead to a post-shrinkage at the level of the blocks or modules and cause opening of the joints between the components placed side by side, which is highly prejudicial to the maintenance of the structure of the furnace, because it is then subjected directly to the heat flow and to the corrosive volatile components which prevail in the furnace. In combination with the structural heterogeneity, the post-shrinkage can lead to the fall of the parts which have been transformed to the greatest extent, a phenomenon which is harmful for the usual uses.

There thus exists a need for improved fibrous components made of AZS, such as modular and block components, which can be used continuously at higher temperatures than the current components while retaining the other desirable properties of these components.

SUMMARY OF THE INVENTION

The aim of the present invention is precisely to satisfy this need by providing a refractory thermally-insulating component made of AZS fibers which has improved behavior and which has a degree of crystallization which is homogeneous throughout its entire mass.

DESCRIPTION OF THE PREFERRED EMBODIMENTS

More particularly, the invention relates to a refractory thermally-insulating component consisting essentially of refractory ceramic fibers which are mechanically combined with one another, the composition of which comprises at least 97.5% by weight of alumina, silica and zirconia in total, wherein:

a) no organic or inorganic binder binds the fibers to one another;

b) the fibers have the following chemical composition, as % by weight:
   $Al_2O_3$: 33–45%
   $SiO_2$: 41–53%
   $ZrO_2$: 5.5–17%
   MgO: 0.02–2%
other oxides:<0.50% with $Fe_2O_3+TiO_2 \leq 0.20\%$ and $Na_2O+CaO+K_2O \leq 0.30\%$;

c) the said fibers homogeneously have, throughout the entire body of the component, a degree of crystallinity of not less than 30% and not more than 64% the crystals present being essentially formed of mullite crystals and of quadratic zirconia; and d) the said component has a linear shrinkage of no more than 3% after being held for 24 hours at 1450° C.

The $ZrO_2$ content is preferably not less than 10% by weight.

The linear shrinkage preferably does not exceed 2.5%.

The component of the invention also preferably has an elasticity of not less than 33.3%, the said elasticity corresponding to the percentage of increase in thickness of a component compressed to a density of 200 kg/m³ when the compressive forces are released. For example, a block with a thickness of 300 mm compressed to 200 kg/m³ and placed under a plastic cover should adopt a thickness of not less than 400 mm when released from its cover after it has been placed in a furnace.

The improved refractory thermally-insulating component of the invention can be, for example, produced by a process essentially consisting in:

a) forming a web of refractory fibers having the following chemical composition, as % by weight:
$Al_2O_3$: 33–45%
$SiO_2$: 41–53%
$ZrO_2$: 5.5–17%
MgO: 0.02–2%
other oxides:<0.50% with $Fe_2O_3+TiO_2 \leq 0.20\%$ and $Na_2O+CaO+K_2O \leq 0.30\%$;

b) cutting this web into strips, and c) assembling the strips into precompressed, thermally-insulating refractory components, in which, prior to Stage (c), the web or the strips are treated thermally in an oxidizing atmosphere by heating them to a maximum temperature of 1250 to 1450° C., preferably of 1250° to 1400° C. for reasons of availability of a treatment furnace capable of working above 1400° C., at a rate and for a time sufficient to ensure the development of a homogeneous crystallization, until a degree of crystallinity of not less than 30% and not more than 64% is reached, the crystals formed being essentially microcrystals (<100 nm) of mullite and of quadratic zirconia.

The fibers constituting the component of the invention are mechanically combined with one another, without use of any organic or inorganic binder. "Mechanically combined" means that the fibers form a coherent mass whose cohesion is the result only of a mechanical action such as a compression, a needling or other equivalent means which produces entanglement of the fibers.

The components according to the invention must have a linear shrinkage of not more than 3% and preferably not more than 2.5% after having been maintained at 1450° C. for 24 hours. This ensures that they will have a low shrinkage at the continuous operating temperature targeted, which will generally be less than 1450° C.

With this objective in view (shrinkage≦3%), it was determined by a series of tests that the chemical composition of the fibers had to comprise, as essential ingredients constituting not less than 97.5% of the composition, as % by weight, 33–45% of $Al_2O_3$, 41–53% of $SiO_2$ and 5–17% of $ZrO_2$, the compositions lying outside these ranges having shrinkages greater than 3%. The minor constituents MgO, $Fe_2O_3$, $TiO_2$, CaO, $Na_2O$ and $K_2O$ optionally present are impurities arising from the starting materials. These impurities influence the quantity and the quality of the vitreous phase of the fibers and, therefore, the sticking phenomenon which, in its turn, has a direct effect on the elasticity. MgO, for its part, can be tolerated up to a content of 2.0%, beyond which value its action becomes harmful to the shrinkage and the elasticity of the product.

In order to satisfy the objective of low thermal shrinkage in high temperature operation and of retaining the other desirable properties of the components made of AZS fibers, namely low density, low thermal conductivity, flexibility of the fibers desirable for manipulation and shaping of precompressed components, and elasticity of the components for easy installation of the latter, we have found that the constituent fibers of the components according to the invention had to have a homogeneous degree of crystallinity of not less than 30% and not more than 64% in order to establish a good compromise between the various requirements. The fibers do not have sufficient thermal stability (excessive linear contraction) below 30% and the other desirable properties (in particular elasticity) deteriorate excessively above 64%.

The crystals formed must be essentially formed of mullite and of quadratic zirconia. Small amounts of monoclinic zirconia (<2.5%) and cristobalite (≦1%) can, however, be tolerated. The crystals formed must also be fine-grained, that is to say with a size less than 100 nm, preferably less than 70 nm.

To ensure the desired degree of crystallinity, the fibers are subjected to a controlled high-temperature heat treatment. It was found that a heat treatment at a temperature of 1250° to 1450° C. and preferably of 1250° to 1400° C. made it possible to obtain satisfactory products in reasonable times. However, not every treatment in this temperature range will give the desired result, that is to say the production of a final insulating component having a linear shrinkage of less than 3%. Three parameters are to be taken into account as regards the heat treatment, namely the maximum treatment temperature, the heating rate (from approximately 980° C.) and the residence time at the maximum temperature.

The relationships between these three parameters are not simple and are most easily expressed by a graph. The single figure is an example of such a graph which makes it possible to determine, as a function of the maximum treatment temperature and the heating rate used (namely 150° C./min or 500° C./min in the cases illustrated), the minimum (given by the lower curve) and maximum (given by the upper curve) residence times for maintaining the fibers at the maximum temperature. For example, for a treatment at 1320° C. with a heating rate of 150° C./min, the residence time can vary between approximately 2 and 7 min whereas it could be from approximately 6 to 15 min for a heating rate of 500° C./min. Of course, the heating rates of 150° C./min and 500° C./min are only indicative rates and curves analogous to those of the figure could be traced for other heating rates.

As indicated above, the refractory fibers are treated before their conversion to an insulating component because the direct heat treatment of a finished insulating component is not industrially realistic (duration, cost) and would lead to heterogeneities in the body of the component. The heat treatment is therefore advantageously carried out on the mats or webs of fibers obtained in production and commonly used for manufacturing insulating components, for example by cutting according to strips, juxtaposition of the latter with precompression and encasing.

The following non-limiting examples are given with the aim of illustrating the invention.

EXAMPLES 1–6 AND COMPARATIVE EXAMPLES A–D

A mixture based on $Al_2O_3$, $SiO_2$ and $ZrO_2$ oxides having the compositions A, B, 1, 2, 3, 4, 5, 6, C and D, in which the zirconium oxide varies from 3 to 22% by weight of the total composition, was melted, poured and then dispersed by blowing, according to methods well known to those skilled in the art. The fibrous mass obtained was shaped, in a way known per se, into webs with a thickness of 19 to 25 mm by mechanical compacting with needling. These webs have a density of the order of 96 kg/m³. These webs were then heat-treated in an electric furnace in an oxidizing atmosphere (air) by bringing them, at the rate of 150° C./minute, to 1250° C. and by maintaining them for 2.5 minutes at this temperature. The properties of these products are summarized in Table 1.

In a second series of tests, non-heat-treated fibers of the composition 5 of Table 1 were subjected to various heat treatments in order to determine their effect on the degrees of devitrification and the size of the mullite crystals. The conditions adopted for these heat treatments are summarized in Table 2. The properties of the products obtained are summarized in Table 3.

The values shown for the chemical analyses and the properties such as the post-shrinkage, the degree of devitrification, the size of the crystals and the elasticity are given within the limits of accuracy of the methods used.

For this second series of tests, the crystallization sequences were studied for various holding temperatures and times by placing samples in an electric furnace. The phases formed and the degree of crystallization are measured by a method using X-ray diffraction on the products which have thus been heat-treated, after they have been cooled.

This method consists in determining the volumes of the phases of any sample of AZS molten fibers by comparison with a crystalline AZS fibrous product standard analyzed beforehand using pure mullite, cristobalite and monoclinic zirconia standards. For quadratic zirconia which is metastable under ambient conditions, due to lack of a standard and to the fact that this phase is formed from small crystalline domains and thus has a poor state of crystallization for such a measurement, the volume is determined by calculating the total zirconia-monoclinic zirconia difference.

The operating conditions were the following:

Proportional counter diffractometer, copper anticathode and nickel filter, horizontal goniometer, tube supply: 40 kV, 30 mA and rotating sample holder. The measurements are carried out on the following lines:

cristobalite: 21°92(d+0.404 nm)

monoclinic zirconia: 28°19(d+0.316 nm)

mullite: 25°96 and 26°27 (d+0.342 nm and 0.339 nm)

Reference sample consisting of AZS molten fibers heat-treated at 1350° C. for 24 hours. Their chemical analysis is, in weight %, $Al_2O_3$=38.4%, $SiO_2$=47.2%, $ZrO_2$=12.9%, $Fe_2O_3$=0.13%, $TiO_2$=0.05% and $MgO+CaO+Na_2O$<0.25%. Measurement of the crystalline phases present gives: mullite=52%, cristobalite=22.6% and monoclinic zirconia=2.3%. Approximately 10.5% of quadratic zirconia is deduced by calculation.

The size of the mullite microcrystals formed by crystallization is also measured by X-ray diffraction by applying the method of broadening the diffraction line with<110> Miller indices. Only the sizes below 100 nm can be measured.

TABLE 1

| Example | $Al_2O_3$ %* | $SiO_2$ %* | $ZrO_2$ %* | MgO %* | $Fe_2O_3$ + $TiO_2$ %* | $Na_2O$ + $K_2O$ + CaO %* |
|---|---|---|---|---|---|---|
| A | 44.5 | 52.0 | 3.0 | 0.05 | 0.2 | 0.2 |
| B | 53.6 | 42.6 | 3.4 | 0.05 | 0.15 | 0.2 |
| 1 | 43.9 | 50.4 | 5.5 | 0.02 | 0.2 | 0.15 |
| 2 | 39.5 | 50.0 | 10.0 | 0.05 | 0.2 | 0.2 |
| 3 | 39.3 | 48.0 | 12.3 | 0.07 | 0.15 | 0.15 |
| 4 | 37.5 | 45.0 | 17.0 | 0.05 | 0.2 | 0.2 |
| 5 | 38.0 | 46.1 | 15.3 | 0.10 | 0.2 | 0.3 |
| 6 | 41.0 | 41.9 | 15.0 | 1.60 | 0.2 | 0.25 |
| C | 36.0 | 44.9 | 13.5 | 5.10 | 0.15 | 0.3 |
| D | 35.0 | 42.5 | 22.0 | 0.05 | 0.2 | 0.2 |

| Example | Degree of crystallization (%)** | Size of the mullitecrystalites (nm) | Post-shrinkage of the untreated fibers (%)*** | Post-shrinkage of the treated fibers (%)*** | Elasticity (%)**** |
|---|---|---|---|---|---|
| A | 27 | 20 | 8.5 | 5.0 | 50 |
| B | 30 | 30 | 6.5 | 4.2 | 43.3 |
| 1 | 30 | 35 | 5.5 | 3.0 | 36.7 |
| 2 | 30 | 30 | 4.1 | 1.6 | 43.3 |
| 3 | 31 | 25 | 4.5 | 1.5 | 46.7 |
| 4 | 33 | 25 | 3.9 | 1.7 | 40 |
| 5 | 31 | 23 | 4.3 | 1.8 | 46.7 |
| 6 | 41 | 35 | 5.2 | 2.2 | 35 |
| C | 40 | 45 | 7.3 | 4.9 | 23.3 |
| D | 38 | 30 | 7.5 | 3.7 | 36.7 |

*% by weight (reduced to 100%)
**% by volume
***Linear post-shrinkage at 1450° C., 24 hours according to the 41st PRE recommendation
****% of increase in thickness of a component compressed to 200 kg/m³ from a thickness of 300 mm when compression is released
Note: The proportions shown were determined to the accuracy of the analysis, which explains why the sum of the ingredients does not add up to exactly 100%.

TABLE 2

| Treatment | T max (°C.) | Time at T max (mn) | Heating rate (°C./min) |
|---|---|---|---|
| I | 1150 | 5 | 150 |
| II* | 1250 | 2.5 | 150 |

TABLE 2-continued

| Treatment | T max (°C.) | Time at T max (mn) | Heating rate (°C./min) |
|---|---|---|---|
| III | 1350 | 5 | 150 |
| IV | 1400 | 10 | 500 to 600 |
| V | 1400 | 1.8 | 500 |
| VI | 1400 | 10 | 150 |
| VII | 1450 | 15 | 500 |

*The type of treatment II corresponds to the treatment conditions of the compositions of Table 1

TABLE 3

| Treatment | Mullite (%)* | Tetragonal zirconia (%)* | Mono clinic zirconia (%)* | Cristobalite (%)* | Residual glass (%)* | Degree of crystallization (%)* | Size of the mullite crystallites (nm) | Post-shrinkage (%)** | Elasticity (%)*** |
|---|---|---|---|---|---|---|---|---|---|
| I | 20 | 8 | <1 | <1 | 72 | 28 | 18 | 3.1 | 53 |
| II | 26.5 | 4.5 | <1 | <1 | 69 | 31 | 23 | 1.8 | 46.7 |
| III | 41 | 10 | <1 | <1 | 49 | 51 | 42 | 2.5 | 40 |
| IV | 49 | 13 | 1 | <1 | 36 | 64 | 57 | 0.2 | 33.3 |
| V | 33 | 3 | <1 | <1 | 64 | 36 | nd | 3.8 | 33.3 |
| VI | 44 | 13 | <1 | <1 | 43 | 57 | 64–70 | 5.4 | 26.7 |
| VII | 50 | 11.5 | 3 | 3.5 | 32 | 68 | 75 | 3.2 | 20 |

*% by volume
**Linear after-contraction at 1450° C., 24 hours according to 41st recommendation PRE
***% of increase in thickness of a component compressed to 200 kg/m³ from a thickness of 300 mm, when compression is released.

We claim:

1. A refractory, thermally-insulating component which displays a linear shrinkage not exceeding 3% after exposure to a temperature of 1450° C. for 24 hours and which consists essentially of refractory ceramic fibers which are mechanically entangled and not bound by organic or inorganic binders, each said fiber being formed of a composition comprising 33–45 wt % $Al_2O_3$, 41–53 wt % $SiO_2$, 5.5–7 wt % $ZrO_2$, 0.02–2 wt % MgO, up to 0.2 wt % $Fe_2O_2+TiO_2$ and up to 0.3 wt % $Na_2O+CaO+K_2O$, the amount of $Al_2O_3+SiO_2+ZrO_2$ being at least 97.5 wt %, and each fiber having a homogenous degree of crystallinity of between 30 and 64%, crystals therein being essentially mullite and quadratic zirconia.

2. The component as claimed in claim 1, wherein said linear shrinkage does not exceed 2.5%.

3. The component as claimed in claim 1, wherein the $ZrO_2$ content is not less than 10% by weight.

4. The component as claimed in claim 1, which has an elasticity of not less than 33%, said elasticity corresponding to the percentage of thickness recovery of said components compressed to a density of 200 Kg/m³ when the compressive forces are released.

5. The component as claimed in claim 1, which contains less than 2.5% by weight of monoclinic zirconia crystals and not more than 1% by weight of cristobalite crystals.

* * * * *

UNITED STATES PATENT AND TRADEMARK OFFICE
CERTIFICATE OF CORRECTION

PATENT NO. : 5,631,084
DATED : May 20, 1997
INVENTOR(S) : Urffer et al.

It is certified that error appears in the above-indentified patent and that said Letters Patent is hereby corrected as shown below:

In column 7, line 38 (claim 1, line 7), replace "5.5-7 wt" with --5.5-17 wt--.

Signed and Sealed this

Twenty-sixth Day of May, 1998

Attest:

BRUCE LEHMAN

Attesting Officer    Commissioner of Patents and Trademarks